United States Patent [19]
Neijzen et al.

[11] Patent Number: 5,899,551
[45] Date of Patent: *May 4, 1999

[54] DISPLAY DEVICE HAVING A DIFFUSING DISPLAY PANEL AND A REFLECTING POLARIZER

[75] Inventors: Jacobus H. M. Neijzen, Eindhoven, Netherlands; Anthonie H. Bergman, Ossining, N.Y.

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/449,134

[22] Filed: May 24, 1995

[30] Foreign Application Priority Data

May 31, 1994 [EP] European Pat. Off. .............. 94201538

[51] Int. Cl.$^6$ ................................................. G02F 1/1335
[52] U.S. Cl. ............................... 349/115; 349/112; 349/96
[58] Field of Search ................................. 359/51, 52, 64, 359/65; 349/87, 89, 96, 98, 112, 114, 115

[56] References Cited

U.S. PATENT DOCUMENTS

| | | | |
|---|---|---|---|
| 4,032,218 | 6/1977 | Scheffer | 359/65 |
| 4,073,571 | 2/1978 | Frinberg et al. | 359/65 |
| 4,239,349 | 12/1980 | Scheffer | 359/69 |
| 4,985,809 | 1/1991 | Matsui et al. | 362/31 |
| 5,029,986 | 7/1991 | De Vaan | 350/338 |
| 5,046,837 | 9/1991 | Stroomer et al. | 353/82 |
| 5,098,184 | 3/1992 | Van Den Brandt et al. | 353/102 |
| 5,150,234 | 9/1992 | Takahashi et al. | 359/65 |
| 5,188,760 | 2/1993 | Hikmet et al. | 252/299.01 |
| 5,208,687 | 5/1993 | Yoshida et al. | 359/51 |
| 5,372,745 | 12/1994 | Yoshinaga et al. | 359/52 |
| 5,486,884 | 1/1996 | De Vaan | 359/101 |
| 5,506,704 | 4/1996 | Broer et al. | 359/63 |
| 5,570,210 | 10/1996 | Yoshida et al. | 349/98 |

FOREIGN PATENT DOCUMENTS

| | | |
|---|---|---|
| 93203057 | 12/1993 | European Pat. Off. . |
| 9411776 | 5/1994 | WIPO . |

OTHER PUBLICATIONS

"A Full–Color TFT–LCD With A Polymer–Dispersed Structure", by Yoshida et al, Japan Display, 92, pp. 631–634.

"Highly Multiplexed Super Homeotropic LCD", by Clerc et al, Japan Display '89 pp. 188–191.

Electro–Optic Properties and Multiplexibility for Polymer Network Liquid Crystal Display (PN–LCD), by Fujisawa et al, Japan Display '89, pp. 690–693.

"Polymer Encapsulated Nematic Liquid Crystals for Display and Light Control Applications", by Fergason, SID 85 Digest, pp. 68–70.

"Retardation Film For STN–LCDs" "NRF", Nitto Denko, SID '92, pp. 8–13.

Retroflecting Sheet Polarizer, by Weber, SID 93 Digest, pp. 669–672.

"Polarizing Color Filters Made From Cholesteric LC Silicones", by Maurer et al, SID 90 Digest, pp. 110–113.

Primary Examiner—Tiep H. Nguyen
Attorney, Agent, or Firm—F. Brice Faller

[57] ABSTRACT

Display device (1) comprising an illumination system (3) having a radiation source (17; 31, 35) for supplying a radiation beam. The display device (1) also comprises a diffusing display panel (5). This panel (5) consists of an optically active diffusing medium (7) which is switchable between a transparent, polarization-maintaining state and a diffusing, depolarizing state for the radiation beam. The medium (7) is present between a first polarizer (9) having a first state of polarization and a second polarizer (11) having a second, complementary state of polarization. At least the first polarizer (9) is a reflecting polarizer and polarization-converting means (10) are arranged at a side of the first polarizer (9) facing away from the display panel (5).

13 Claims, 4 Drawing Sheets

DISPLAY DEVICE HAVING A DIFFUSING DISPLAY PANEL AND A REFLECTING POLARIZER

BACKGROUND OF THE INVENTION

The invention relates to a display device comprising an illumination system having a radiation source for supplying a radiation beam, and at least a diffusing display panel comprising an optically active diffusing medium which is switchable between a transparent, polarization-maintaining state and a diffusing, depolarizing state for the radiation beam, and a first polarizer having a first polarization effect and a second polarizer having a second, complementary polarization effect, said polarizers enclosing the medium.

The invention also relates to a diffusing display panel.

The display devices under consideration may be grouped into two types, viz. image projection devices and flat-panel display devices.

An image projection device is a device in which an image generated by means of a display panel, for example a diffusing panel, is imaged at a relatively large distance and in a magnified form on a projection screen by means of a projection lens system. The illumination system for this device comprises, for example a radiation source and a beam-concentrating optical system.

In a flat-panel display device an image is also generated by a display panel. The dimension of this device in the direction transverse to the display panel is relatively small, much smaller than the dimension of an image projection device. In a flat-panel display device a viewer directly watches the display panel so that this device may also be referred to as a direct-vision device. The illumination system used may be, for example the assembly of a radiation source and an optically transparent plate of, for example PMMA used as a waveguide, while the radiation source is formed as a peripheral illumination system for this waveguide, as described, for example in U.S. Pat. No. 4,985,809. The illumination system may alternatively be a known blacklight illumination system.

The display device may be, for example a video display device or a monitor of a computer system, or the display device for an instrument panel.

In a display device in which the display panel comprises a TN LCD panel, an acceptable contrast can be achieved only within a limited viewing angle. The viewing angle may be increased by making use of diffusing display panels. Since the increase of the viewing angle will be at the expense of the contrast, the diffusing display panel is arranged between two absorbing polarizers having complementary states of polarization. Such display panels are known per se from, for example the article: "A full-colour TFT-LCD with a polymer-dispersed structure" by H. Yoshida et al. in Japan Display '92, pp. 631–634. The display panel described in this article has a PDLC layer (Polymer-Dispersed Liquid Crystal) as an optically active diffusing medium which is enclosed between two absorbing polarizers having complementary directions of polarization. The PDLC layer consists of a liquid crystalline material which is dispersed in the form of drops in a transparent polymer material. If no voltage is applied across the layer, the molecules within the drops have a given net orientation, but the orientation between the drops themselves is different. The radiation from a radiation source is polarized by the first polarizer. By diffusion within the PDLC, the polarized radiation is depolarized and consequently substantially 50% is passed by the second polarizer towards the viewer. The display panel is in the bright state in this case. However, if a voltage is applied, in other words if picture information to be displayed is applied to the display panel, and the molecules are thus subjected to an electric field, the molecules within the drops will orient substantially perpendicularly to the substrate and the PDLC itself becomes transparent. The radiation from the radiation source is again polarized by the first polarizer but passed unobstructed through the PDLC and consequently absorbed by the second polarizer. In this case the display panel displays a dark picture.

The PDLC within a pixel is thus switchable between a diffusing and a transparent state, which corresponds to a light-transmissive and an opaque state, respectively, of the relevant pixel of the display panel.

A drawback is, however, that only 25% of the light supplied by the radiation source can be used for the formation of a picture, even when ideal absorbing polarizers are used, because a loss of substantially 50% occurs in both polarizers due to absorption of the unsuitable direction of polarization. There should be sufficient light for the viewer, both in a direct-vision device and in an image projection device.

To compensate for the loss of light in the polarizers, high-power lamps must be used in both devices, which lamps consume much electric power, have a shorter lifetime and may have to be cooled.

If a portable direct-vision display device is used, the batteries will have a shorter lifetime because they must feed a high-power lamp. Moreover, a higher intensity will lead to hotter polarizers.

If an image projection device is used, the device should be provided with a radiation source having a high intensity.

Since the light intensity incident on the polarization means is high in both cases, the polarization means are considerably heated due to the absorption. Since these polarizers are present proximate to the display panel in the devices under consideration, it may be necessary to incorporate a cooling system, which renders the display device more complicated and more expensive and produces a troublesome noise.

OBJECTS AND SUMMARY OF THE INVENTION

It is an object of the invention to provide an efficient display device having a relatively large viewing angle in combination with a relatively high brightness, in which the above-mentioned drawbacks are obviated.

To this end at least the first polarizer is a reflecting polarizer and polarization-converting means are arranged at a side of the first polarizer facing away from the display panel.

Polarization-converting means are understood to be means which convert the unwanted state of polarization into the desired state of polarization and also send it in the direction of the display panel.

The radiation having the desired direction of polarization is passed by a reflecting polarizer, whereas the radiation having the unwanted direction of polarization is reflected. If further means are provided which convert the unwanted direction of polarization at least partly into the desired direction of polarization, this beam will also at least partly be passed to the optically active diffusing medium. In this way, substantially the complete radiation beam from the radiation source is passed by the first polarizer due to repeated reflection and conversion of the direction of polarization, so that a much larger part of the radiation beam emitted by the radiation source can be utilized for forming the picture.

Preferably the two complementary polarizers are reflecting polarizers.

Since the second polarizer is now also a reflecting polarizer, repeated reflection and conversion of the direction of polarization leads to a substantially complete use of the radiation beam from the radiation source for forming the picture so that a relatively high brightness is achieved in a system having a relatively large viewing angle.

An embodiment of the display device according to the invention is characterized in that the reflecting polarizer is a cholesteric filter and in that the polarization-converting means comprise a reflector.

Cholesteric filters have an optical layer of a liquid crystalline material having a cholesteric ordering. This means that the molecules of the material in solution are spontaneously ordered to form a helical structure having a pitch p. After such a solution has been provided as a thin, optically active layer between two parallel substrates, the helical structure is directed in such a way that the axis of the helix will be transverse to the layer. The alignment of the helix can be improved by providing an orientation layer on the facing surfaces of the substrates.

When an unpolarized radiation beam is incident on such a filter, radiation whose circular direction of rotation (laevorotatory or dextrorotatary) corresponds to the direction of the molecular helix and has a wavelength corresponding to the pitch p of the helix will be reflected, while radiation having the opposite direction of polarization and a wavelength not adapted to the filter will be transmitted. The reflection wavelength $\lambda_0$ of the cholesteric filter is defined by $$\lambda_0 = \tfrac{1}{2}(n_o + n_e)p$$

in which $n_o$ and $n_e$ are the respective ordinary and extraordinary refractive indices of the material of the filter and p is the pitch of the molecular helix.

The light having the direction of polarization which is unwanted for the polarizer is thus no longer absorbed but reflected by the cholesteric filter, so that heating due to absorption is prevented.

When the optically active medium is in a diffusing state, the radiation passed by the first polarizer is depolarized in the diffusing medium at a given state of polarization.

Depolarizing is herein understood to mean that radiation having a given state of polarization is at least partly converted into unpolarized radiation, i.e. radiation comprising different polarization components.

A part of the radiation depolarized in the diffusing medium is suitably polarized so as to be transmitted towards the viewer by the second polarizer. The remaining part of the radiation is reflected on this second polarizer and depolarized again in the medium. A part of this depolarized radiation is passed towards the illumination system by the first polarizer and the remaining part is again reflected towards the diffusing medium, depolarized in this medium and subjected to a partial reflection on the second polarizer and a partial transmission analogously with the description above. The state of polarization of the radiation returning to the illumination system is inverted on the reflector of the illumination system and consequently rendered suitable for transmission towards the diffusing medium by the first polarizer.

Since the unsuitable state of polarization is reflected and is further utilized instead of being absorbed and getting lost, the displayed picture acquires a high contrast, while the polarizers do not get any hotter.

A further advantage of using a cholesteric filter as a reflective polarizer is that these filters can be arranged between the substrates and the LC material of the display panel. In this way, parallax can be avoided.

It is to be noted that it is known per se to use a cholesteric filter as a polarizer.

Cholesteric filters are known, for example from the article "Polarizing Colour Filters made from Cholesteric LC Silicons" by R. Maurer et al. in SID International Symposium 1990, Digest of Technical Papers, pp. 110–113.

The cholesteric filters described in this article have an optically active layer comprising a liquid crystalline material with a cholesteric ordering on the basis of silicons.

Said article by Maurer does not propose to combine the cholesteric filter with a depolarizing diffusor and a reflector in order to realise a higher light output in combination with a larger viewing angle.

A further embodiment of the display device according to the invention is characterized in that the cholesteric filters comprise a plurality of layers of a liquid crystalline material, each layer being active for a different wavelength band, said wavelength bands jointly covering the visible wavelength range.

Since the cholesteric filter is active throughout the visible wavelength range, the unwanted direction of polarization is reflected by the polarizers for all radiation in this wavelength range and can be utilized again after depolarization so that the display panel may be both a monochrome and a colour display panel.

An alternative and preferred embodiment of the display device according to the invention is characterized in that the cholesteric filters comprise a single layer of a liquid crystalline polymer material, within which layer the pitch of the molecular helix varies continuously between two values which correspond to the lower limit and the upper limit, respectively of the reflection band required to cover the full visible wavelength range.

The pitch of the molecular helix of a single-layer liquid crystalline polymer material having a cholesteric ordering can be varied continuously. Such a single-layer layer cholesteric filter is described in non-prepublished European Patent Application EP 93203057.0 in the name of the Applicant. By realising a sufficiently large variation of the pitch within this layer, it is no longer necessary to stack a plurality of cholesteric layers each formed by a liquid crystalline material having a different wavelength reflection band. In the cholesteric filter having a continuously varying pitch, the polymer layer is divided into imaginary sub-layers each having their own pitch and thus reflecting radiation having the unwanted direction of polarization in their own wavelength band. The desired reflection in the desired wavelength range is realised by all sub-layers combined, so that a single layer is sufficient to cover the complete visible wavelength range (between 400 and 780 nm). By continuous variation of the pitch within a single layer, the same wavelength reflection band can be realised over a smaller layer thickness than for a stacked number of discrete layers.

This has the advantage of a better optical quality of the filter. In fact, the quality of such filters decreases relatively rapidly with an increasing number of layers, due to errors which are typical of cholesterics and due to loss of molecular ordering. In order that a cholesteric layer having a reflection band of 50 nm has a polarizing effect, the layer should have a minimum thickness of 5 $\mu$m. To cover the complete visible wavelength range, a minimum number of seven to eight layers is consequently required if the increase of the required reflection bandwidth due to the viewing angle dependence is not taken into account. This yields a minimum layer thickness of 35 μm. In a single-layer cholesteric filter, within which the pitch varies continuously across the layer thickness, a layer thickness of 20 μm is sufficient for operation as a polarizer. Moreover, the viewing angle dependence of the filter increases with an increasing thickness. This means that, for radiation incident at an angle which is larger than a given angle of incidence, the effectiveness of the filter decreases considerably at larger layer thicknesses.

A further embodiment of the display device according to the invention is characterized in that the diffusing medium is constituted by a liquid crystalline layer which is enclosed between two optically transparent plates, and in that the cholesteric filters constitute a three-dimensional network and a self-supporting film which is suitable to be provided directly on the plates.

This considerably simplifies the manufacture of the display panel.

The same concept may also be used if cholesteric materials are used which are not suitable for realising a sufficiently large variation of the pitch of the helix in a single layer.

A further embodiment of the display device according to the invention, in which this is the case, is characterized in that at least a plurality of layers of the cholesteric filters comprises a liquid crystalline polymer in which the pitch of the molecular helix varies, each layer being active in a different wavelength band.

By varying the pitch in a plurality of layers or in each layer of the filter, the wavelength range of the relevant layer is increased. Consequently, the number of layers required to cover the complete visible wavelength range can be limited considerably so that the afore-mentioned advantages of the smaller number of cholesteric layers also apply in this case.

Since the effectiveness of a cholesteric filter is not only dependent on the wavelength of the radiation incident thereon, but also on the angle of incidence at which the radiation is incident on the filter, the diffusing medium present in the display panel and ensuring the depolarization of radiation having an unwanted state of polarization may have the drawback that radiation is also diffused towards the cholesteric filter at large angles. When the angle of incidence is varied, the wavelength band, for which the filter reflects polarization-selectively, is shifted. This means that the wavelength band for which the filter should be reflective is equal to the sum of the real wavelength band of the visible wavelength range, for example between 400 and 780 nm, and a fictitious wavelength band so as to be also polarization-selective for radiation which is incident at an angle of incidence which differs from 90°. The shift of the wavelength band as a function of a variation of the angle of incidence is, for example 2 nm per degree, so that the fictitious wavelength band is 360 nm for the extreme case of 180° for the range of angles of incidence. The total reflection band should then be 380 nm+360 nm=740 nm.

A further embodiment of the display device according to the invention is characterized in that the reflecting polarizer is a reflective linear polarizer and in that the polarization-converting means are constituted by a reflector and a λ/4 plate which is arranged between the first polarizer and the reflector.

The reflecting polarizer may also be a linear polarizer, for example in the form of a sheet polarizer. This polarizer reflects the radiation having the unwanted polarization component, for example, the s-polarized beam component, to a reflector via a λ/4 plate, which reflector passes the sub-beam in the direction of the display panel again. In this way the unwanted state of polarization, the s-polarized component, is converted into the desired polarization component, the p-polarized beam component, by passing the λ/4 plate twice and is subsequently also passed by the first polarizer.

If a colour display device is used, the λ/4 plate should operate for a large wavelength range. Such a wideband λ/4 plate is described, for example in the publication "Retardation Film for STN-LCDs 'NRF'" by the firm of Nitto Denko in SID '92 Exhibit Guide, Society for Information Display, May 17–22, 1992, Boston, Mass., USA.

Reflective sheet polarizers are known per se from, for example the article: "Retroreflecting Sheet Polarizer" by M. F. Weber in SID International Symposium 1993, Digest of Technical Papers, Vol. XXIV, May 1993, pp. 669–672.

A further embodiment of the display device according to the invention is characterized in that the optically active diffusing medium comprises a polymerizable liquid crystal.

In the transparent state of the optically active diffusing medium, in other words, in the dark state of the display panel, the diffusion and the birefringence in the diffusing medium are preferably minimal, even at a non-perpendicular passage. By choosing a matrix-shaped combination of ordinary and polymerizable molecules for the liquid crystalline material, which is also referred to as a diffusing gel, the polymer is made birefringent. Without the presence of an electric field, all molecules are oriented in the same direction and the material is transparent. When an electric field is applied, the polymerizable molecules will maintain the same orientation, whereas the non-polymerizable molecules tend to direct themselves perpendicularly to the applied electric field. In this way a disturbing diffusion upon oblique transmission in the transparent state of the optically active diffusing medium can be suppressed. A diffusing gel is known per se from, for example U.S. Pat. No. 5,188,760.

A further embodiment of the display device according to the invention is characterized in that a retardation plate is provided on the side of the display panel facing away from the illumination system.

By using a retardation layer, the disturbing birefringence is suppressed. Examples of such retardation layers are known per se from, for example the article "Highly Multiplexed Super Homeotropic LCD" by J. F. Clerc et al. in Japan Display '89, pp. 188–191.

DESCRIPTION OF THE PREFERRED EMBODIMENTS

Figure 1A:
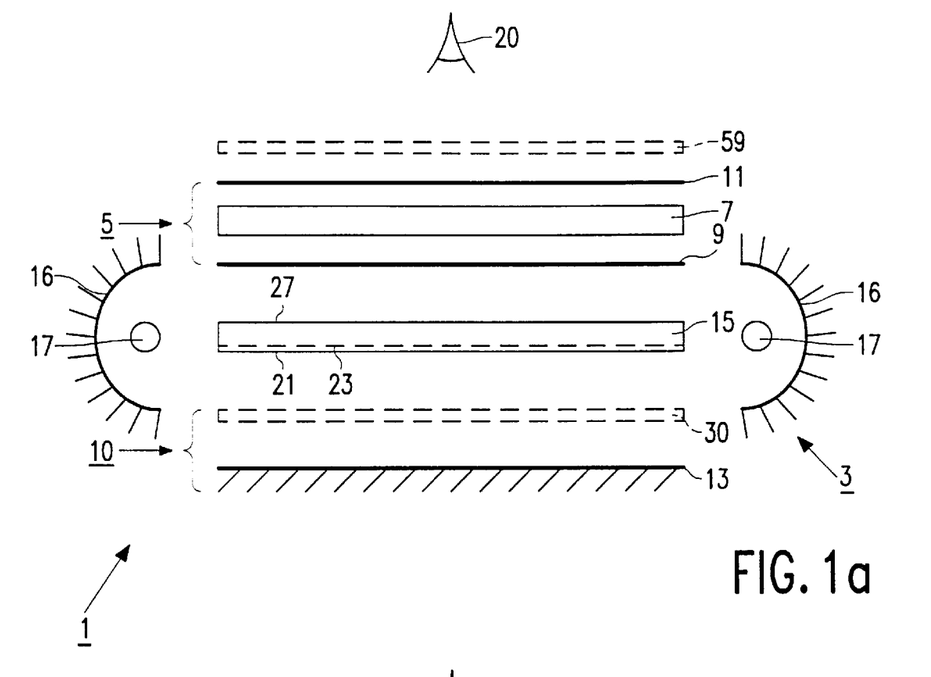
FIGS. 1a and 1b are diagrammatic cross-sections of two embodiments of a display device according to the invention, implemented as a direct-vision device.
Figure 1B:
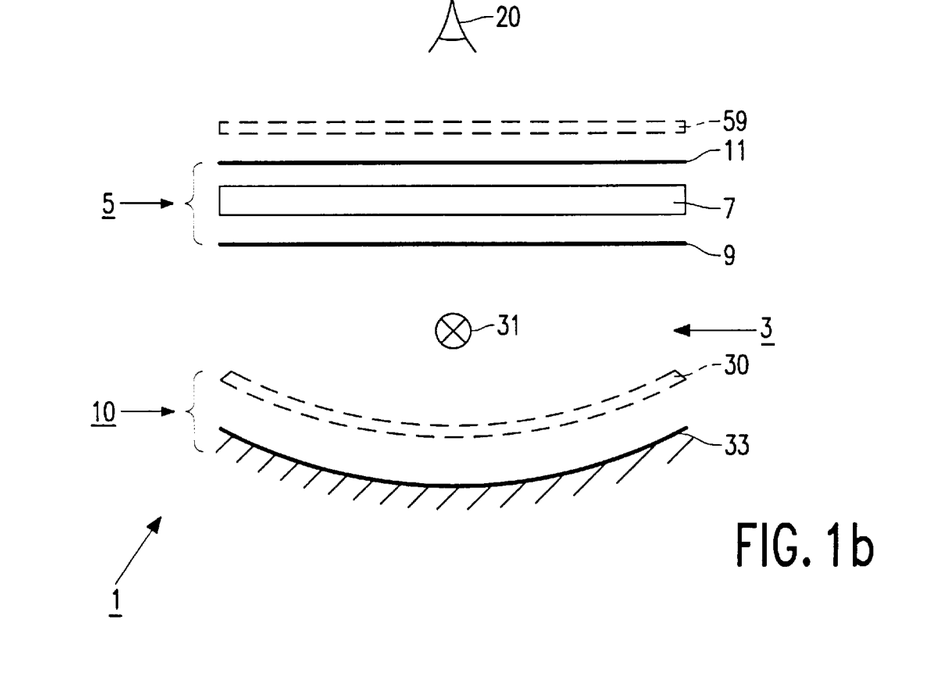

The flat-panel display devices 1 shown diagrammatically in FIGS. 1a and 1b comprise an illumination system 3 for supplying a radiation beam, and a diffusing transmission display panel 5. The diffusing display panel 5 comprises an optically active diffusing, depolarizing medium 7 and a first polarizer 9 and a second polarizer 11 enclosing the medium 7. The two polarizers 9, 11 have complementary polarization effects. If only the first polarizer 9 is implemented as a reflecting polarizer, radiation from the radiation source will be passed towards the medium 7 at the desired state of polarization, whereas radiation having the complementary state of polarization will be reflected. The radiation reflected by the first polarizer 9 is subsequently converted by polarization-converting means 10 into radiation having the state of polarization which can be transmitted by the first polarizer 9. Radiation which is not transmitted by this polarizer 9 is reflected between the polarization converting means 10 and the polarizer 9 until it has the suitable state of polarization for transmission in the direction of the medium 7. In this way, the direction of polarization which is unsuitable for the polarizer 9 is no longer absorbed but every time depolarized and then partly transmitted and partly reflected so as to be changed in its state of polarization, so that all radiation from the source, apart from reflection losses, will ultimately reach the medium 7. The radiation transmitted towards the medium is depolarized in the medium, dependent or not dependent on whether this medium is energized. Since the state of polarization of the second polarizer 11 is complementary to that of the first polarizer 9, the second polarizer 11 will block radiation having the state of polarization suitable for the first polarizer 9. When the medium does not operate in a depolarizing manner and the polarizer 11 is an absorbing polarizer, all radiation transmitted by the first polarizer 9 is absorbed. When the polarizer 11 is reflective, this radiation will be reflected towards the medium 7. If the medium 7 is depolarizing, substantially half the depolarized radiation will be absorbed when an absorbing polarizer 11 is used, whereas this half will be reflected towards the medium again when a reflecting polarizer 11 is used. The part of the depolarized beam having the state of polarization suitable for the second, complementary polarizer 11 will be passed to the viewer in both embodiments of the second polarizer 11. The state of polarization of the radiation reflected by the polarizer 11 is converted by cooperation between the medium 7, the polarizer 9 and the reflector 13; 33; 37, so that this radiation, passing through an energized pixel, will ultimately be transmitted by the polarizer 11. When two reflecting polarizers 9, 11 are used, substantially all radiation from the radiation source is used for image display.

For a flat-panel display device, the illumination system 3 may be implemented as blacklight illumination with peripheral illumination as is shown in FIG. 1a. The display device shown in this Figure comprises an optically transparent plate 15 as a radiation guide whose end faces are surrounded by a radiation source 17 whose radiation is coupled into the plate 15 at said end faces. A reflector 13 is present underneath the radiation guide 15. The radiation sources 17 are also surrounded by a reflector 16 so as to receive the radiation emitted by the radiation sources 17 away from the radiation guide 15 and to send it as yet towards the radiation guide 15. If desired, the reflectors 13 and 16 may be made of one part. The radiation guide 15 comprises, for example a transparent plate whose surface 21 facing away from the display panel 5 is provided with a pattern of dots 23 of a (diffusely) reflecting material. The density and size of the dots increases as the distance to the radiation source 17 in the radiation guide 15 increases. Such a plate used as a radiation guide is known per se, for example from U.S. Pat. No. 4,985,809. In this plate, radiation is coupled into the radiation guide at an end face only. The radiation propagates in the radiation guide 15 and leaves the transparent plate after diffusion on the dot pattern 23 via the surface 27 of the radiation guide 15 facing the display panel 5, so that the display panel is illuminated. Radiation having the state of polarization which is unwanted for the first polarizer 9 is reflected by this first polarizer towards the illumination system 3. The part of this radiation which is incident on the pattern of dots 23 is diffusely reflected and thus depolarized so that approximately half of this radiation acquires the suitable state of polarization again so as to be transmitted by the first polarizer 9. The part of the radiation which is incident between the dots is passed on to the polarization-converting means 10, for example a metal mirror 13 which changes the state of polarization of the radiation incident thereon in such a way that the reflected radiation is passed by the first polarizer 9.

The illumination system 3 may alternatively be implemented as an ordinary blacklight illumination as is shown in FIG. 1b. The illumination system 3 shown in this Figure comprises a radiation source 31 and a reflector 33 at the side of the radiation source 31 facing away from the display panel 5. The state of polarization of radiation which is reflected by the first polarizer 9 is changed by the polarization-converting means 10.

The display device may alternatively be an image projection device. An embodiment of such a device is shown in the diagram in FIG. 2. The image projection device 1 comprises a radiation source 35 and a display panel 5. The display panel also comprises an optically diffusing, depolarizing medium 7 and two reflecting polarizers 9, 11 having complementary states of polarization. A reflector 37 is arranged at the side of the radiation source 35 facing away from the display panel. Moreover, a $\lambda/4$ plate is arranged between the radiation source 35 and the reflector 37, if the polarizers 9, 11 are linear polarizers. Further beam-concentrating and imaging optical systems as described, for example in U.S. Pat. No. 5,098,184, represented by a single lens 39 for the sake of simplicity, may be present between the radiation source 35 and the display panel 5. The image formed by the display panel 7 is subsequently projected on a projection screen 43 by means of a projection lens system 41.

The display device may alternatively be a colour projection device as is known, for example from U.S. Pat. No. 5,046,837. This device has three display panels, one for each of the primary colours red, green and blue and also a number of dichroic mirrors which split up the beam from the radiation source into three monochrome sub-beams each being incident on an associated display panel. After modulation by a further set of dichroic mirrors, the beams passing through these panels are recombined to a single beam which is projected by the projection lens system. In accordance with the present invention, each display panel is a diffusing display panel comprising an optically active diffusing, depolarizing medium which is enclosed between two reflecting polarizers having complementary states of polarization.

It is alternatively possible to use a colour projection device with a single diffusing colour display panel. Then, a matrix of dichroic mirrors arranged in front of the pixels is preferably used. A colour display device having a TN LCD and a matrix of dichroic mirrors is known from U.S. Pat. No. 5,029,986. In accordance with the present invention the display panel is a layer of an optically active diffusing, depolarizing material which is enclosed between two reflecting polarizers having complementary states of polarization.

The reflecting polarizers may be, for example cholesteric filters. Cholesteric filters have an optical layer of a liquid crystalline material having a cholesteric ordering. This means that the molecules of the material in solution are spontaneously ordered to form a helical structure having a pitch p. After such a solution has been provided as a thin, optically active layer between two parallel substrates, the helical structure is directed in such a way that the axis of the helix will be transverse to the layer. The alignment of the helix can be improved by providing an orientation layer on the facing surfaces of the substrates.

When an unpolarized radiation beam is incident on such a filter, radiation whose circular direction of polarization (laevorotatory or dextrorotatary) corresponds to the direction of the molecular helix and whose wavelength corresponds to the pitch p of the helix will be reflected, whereas radiation having the opposite direction of polarization and a wavelength which is not adapted to the filter will be transmitted. The reflection wavelength $\lambda_0$ of the cholesteric filter is defined by $$\lambda_0 = \frac{1}{2}(n_o + n_e)p$$

in which $n_o$ and $n_e$ are the respective ordinary and extraordinary refractive indices of the material of the filter and p is the pitch of the molecular helix.

The light having the direction of polarization which is unwanted for the polarizer is thus no longer absorbed but reflected by the cholesteric filter.

In this case, the polarization-converting means 10 comprise a reflector 13 (FIG. 1a); 33 (FIG. 1b); 37 (FIG. 2) which is arranged at the side of the illumination system 3 facing away from the display panel 5. Since cholesteric filters operate with circularly polarized radiation, substantially half a radiation beam from the radiation source, for example the laevorotatory circularly polarized sub-beam, will be transmitted by the first polarizer 9, whereas the dextrorotatary circularly polarized sub-beam will be reflected towards the illumination system 3. The second polarizer 11 is then transparent to dextrorotatary circularly polarized radiation and will reflect laevorotatory circularly polarized radiation back to the depolarizing medium 7.

Figure 2:
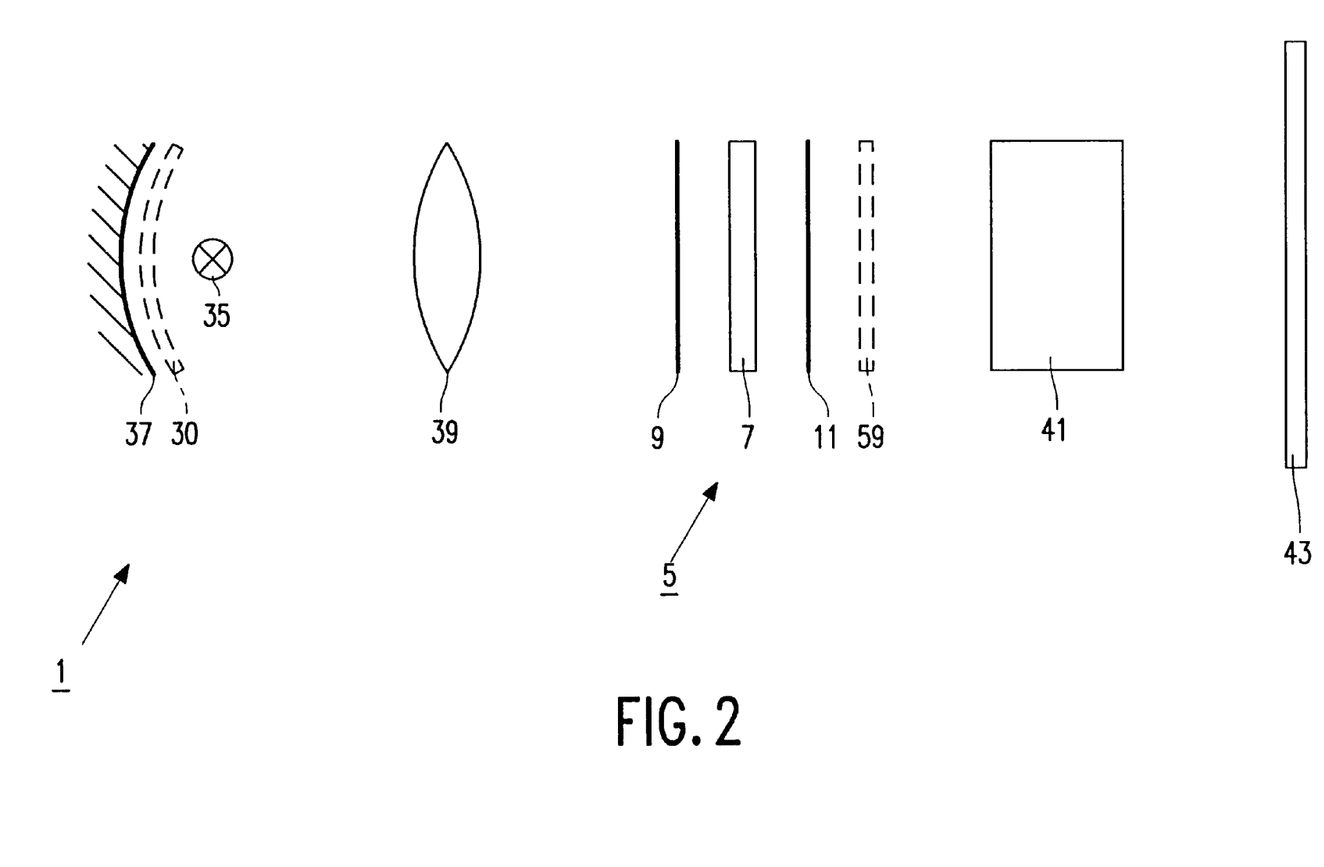
FIG. 2 shows diagrammatically a third embodiment of a display device according to the invention, implemented as an image projection device.

The dextrorotatary circularly polarized radiation, which is reflected towards the illumination system by the first polarizer 9, is incident on the reflector 13; 33; 37 on which the state of polarization is inverted to laevorotatory circularly polarized radiation which will subsequently be transmitted towards the diffusing medium 7 by the first polarizer 9. In the diffusing medium, the laevorotatory circularly polarized radiation is depolarized, i.e. converted into radiation which comprises both laevorotatory and dextrorotatary circularly polarized beam components. The dextrorotatary circularly polarized sub-beam of this unpolarized radiation will be transmitted by the second polarizer 11 towards the viewer 20, whereas the laevorotatory circularly polarized sub-beam will be reflected towards the diffusing medium 7. In the medium 7, this sub-beam is depolarized again, whose dextrorotatary circularly polarized sub-beam is reflected towards the medium 7 by the first polarizer 9 and the laevorotatory circularly polarized component is transmitted towards the illumination system 3 by the first polarizer 9, for which the process described above is repeated. In this way, substantially all radiation from the radiation source is efficiently converted into radiation which is suitable for forming an image.

The cholesteric filters 9, 11 are preferably operative in the full visible wavelength range. Radiation at a wavelength outside the reflection band of the filter is transmitted in an unpolarized form, which means that the filter only operates as a polarizer for a limited wavelength range.

The width of the reflection band $\Delta\lambda$ is given by $\Delta\lambda = \lambda_0 \Delta n / \bar{n}$, in which $\Delta n = n_e - n_o$ is the birefringence and $\bar{n} = (n_e + n_o)/2$ is the average refractive index. $\lambda_0$ is the central wavelength of the selective reflection band at perpendicular incidence of the radiation and is defined by $$\lambda_0 \frac{(n_e + n_o)}{2} p,$$

in which p is the pitch of the molecular helix. In the visible wavelength range, the width of the reflection band is mainly determined by the birefringence $\Delta n$ of the cholesteric material, which birefringence can be varied to a small extent only. Generally, $\Delta n$ will be smaller than 0.3 so that the bandwidth is smaller than 100 nm, and generally about 50 nm.

To obtain a cholesteric filter which is suitable for a colour display device, a plurality of narrow-band cholesteric filters can be stacked, each having a different reflection band. The composite filter then has a reflection bandwidth which is equal to the sum of the reflection bands of the separate layers and which is sufficiently large to polarize the light in the full visible wavelength range.

With a cholesteric filter which consists of one single layer only and whose pitch p of the molecular helix across the layer thickness varies continuously, the reflection band of the relevant layer can be increased to such an extent that this single layer is sufficient to cover the full visible wavelength range.

A bandwidth of 780 nm–400 nm=380 nm is required for the full visible wavelength range. Due to the desired viewing angle variations, this bandwidth should be increased by 180 nm×2 =360 nm, so that the overall bandwidth should be 740 nm. Since the width of the reflection band averages 50 nm for a cholesteric layer in the visible wavelength range, it is consequently necessary to use ~15 layers. If the bandwidth of the cholesteric layer can be increased to, for example 150 nm, the number of layers required is reduced to 5. This has the advantage that the optical quality of the filter will increase considerably because the optical quality decreases with an increasing number of layers due to the presence of errors in the cholesterics and due to the loss of planar molecular ordering when the layers are stacked. Moreover, the viewing angle dependence increases with an increasing number of layers. This means that the effectiveness of the filter decreases considerably for radiation which is incident at an angle of incidence exceeding a given value.

A cholesteric filter consisting of one single layer in which the pitch p varies continuously across the layer thickness can be made as follows. First, a mixture of reactive monomers is made. This mixture comprises different percentages by weight of a chiral component and a nematogeneous component, which components have a different number of reactive groups, for example two and one, respectively, so that the two monomers will have a different reactivity. A stabiliser and a quantity of dye are subsequently added to this mixture. The mixture thus made is then provided between two transparent substrates, each of which may have, for example a layer of polyimide. These layers are used for aligning the molecular helix which is produced spontaneously in the cholesteric mixture. To prevent the formation of disclinations, the two substrates are sheared over a small distance until a planar ordering is created. Subsequently, the reactive mixture is photopolymerized at ambient temperature by means of UV light so that a three-dimensional network is formed. Due to the strength of the optically active layer thus formed, it is possible to detach the optical layer from the substrates and use this layer as a self-supporting cholesteric filter. The desired reflection bandwidth, for example a reflection bandwidth corresponding to the full visible wavelength range, can be achieved by varying the quantity of dye, the wavelength and the power of the UV light.

For further details relating to the manufacture of a single-layer cholesteric filter having a pitch p which continuously varies across the layer thickness, reference is made to the afore-mentioned, non-prepublished Application EP 93203057.0.

The polymer material of the cholesteric filter preferably constitutes a three-dimensional polymer network. In fact, optically active layers consisting of such a three-dimensional network are very robust and can therefore function satisfactorily as self-supporting films. Consequently, it is not necessary to provide the optically active layers with substrates. After the manufacture, the substrates required for alignment and polymerization can be removed, which contributes advantageously to the compactness of the polarizer.

In an embodiment using a multilayer filter in which the optical quality of the filter is even considerably better and the viewing angle dependence is less pronounced than in a cholesteric filter consisting of a plurality of narrow-band cholesteric layers, the cholesteric filter is manufactured from a plurality of layers, in which the pitch p of the molecular helix of at least a number of these layers varies continuously across the layer thickness.

The layers within which the pitch p varies across the layer thickness may be manufactured in a similar way as described above for a single-layer filter.

In an alternative embodiment of a display device, in which substantially all radiation from the radiation source is utilized for forming images, reflective sheet polarizers are used instead of cholesteric filters. Such polarizers are linear polarizers and are known per se from, for example the article: "Retroreflecting Sheet Polarizer" by M. F. Weber in SID International Symposium 1993, Digest of Technical Papers, Vol. XXIV, May 1993, pp. 669–672. The first polarizer 9 is then, for example transparent to the p-polarized beam, whereas the s-polarized component of the radiation from the radiation source is reflected. In this case, the polarization-converting means 10 comprise a reflector 13; 33; 37 in combination with a λ/4 plate 30 as is illustrated by means of a broken line in FIGS. 1a and 1b. The reflected s-polarized component is transmitted to the reflector 13; 33; 37 via the λ/4 plate 30 and again to the first polarizer 9 via the λ/4 plate. By passing the λ/4 plate twice, the state of s-polarization is now converted into the state of p-polarization and will consequently be transmitted by the first polarizer 9. p-polarized radiation is depolarized in the medium 7. The s-polarized sub-beam of this depolarized radiation is transmitted towards the viewer 20 by the second polarizer 11. The p-polarized sub-beam is reflected towards the medium 7 so as to be depolarized therein. Subsequently, approximately half of this radiation, the p-polarized sub-beam, is transmitted towards the illumination system 3 so as to return therefrom as s-polarized radiation. The process of reflection, transmission and depolarization as described above is repeated for this radiation. Thus, all radiation from the source, apart from reflection losses, is transmitted towards the audience space by the activated pixels of the display panel, whereas the non-activated pixels block substantially all radiation so that the displayed image has a maximum contrast.

Figure 3A:
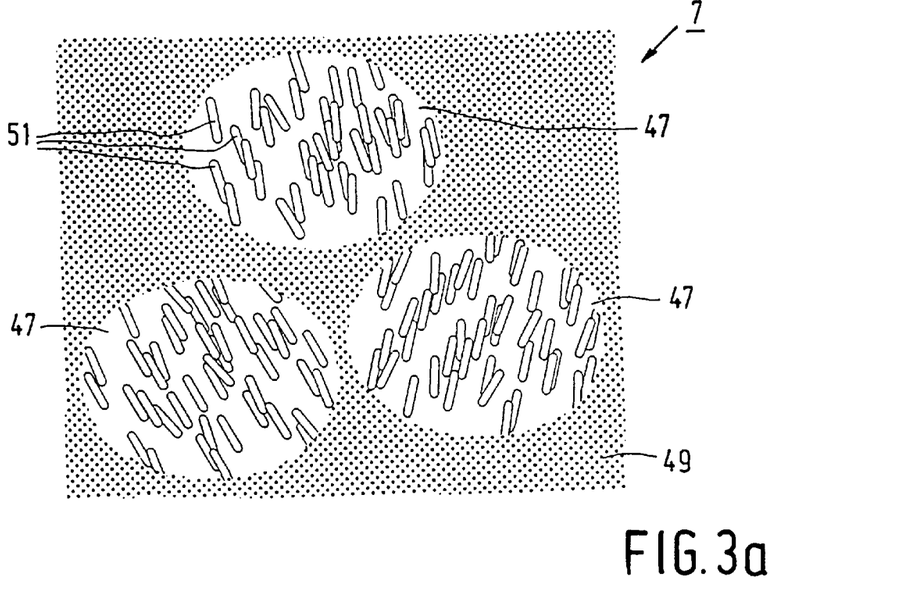
FIG. 3a–b shows diagrammatically an optically active diffusing medium in the form of a PDLC (a) without and (b) with an applied voltage.
Figure 3B:
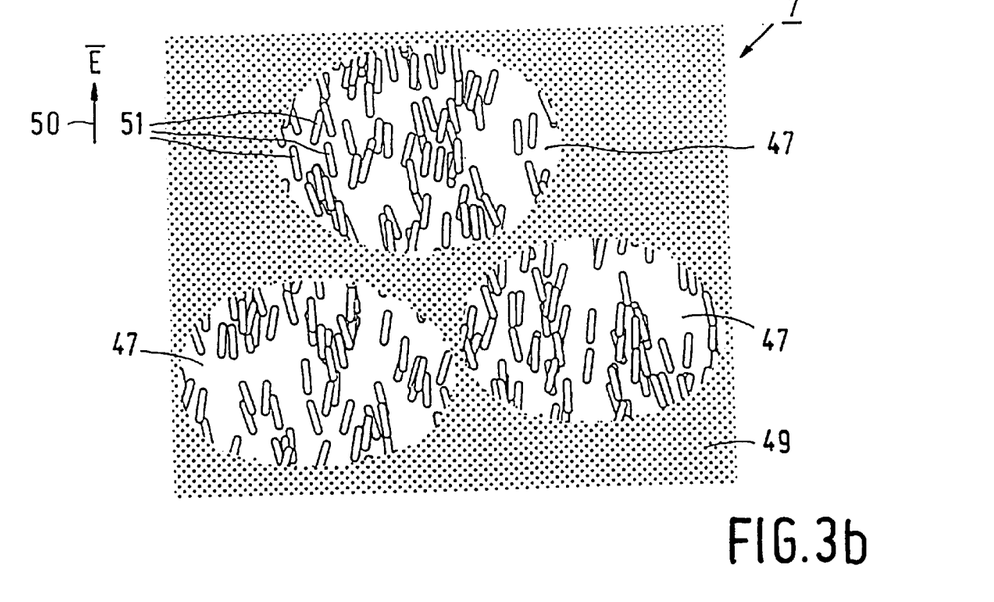

The optically diffusing, depolarizing medium 7 may be, for example a PDLC. FIGS. 3a and 3b show the principal operation of an optically diffusing medium in the form of a PDLC without (a) and with (b) an applied voltage. The direction of the applied electric field is denoted by the arrow 50.

The PDLC (Polymer-Dispersed Liquid Crystal) operates as an optically diffusing, depolarizing material. The PDLC layer 7 comprises a liquid crystalline material having an ordinary refractive index $n_o$ and an extraordinary refractive index $n_o$ which is dispersed in the form of drops 47 in a transparent polymer material 49 having a refractive index $n_p$. If no voltage is applied across the layer 7, the molecules 51 within the drops 47 have the same net orientation, but the drops among themselves have a different orientation, as is shown in FIG. 3a. The radiation from a radiation source 17; 31; 35 is polarized by the first polarizer 9 in a given direction of rotation or linear direction of polarization. Due to mismatch between the refractive indices of the drops and the matrix and mismatch between the refractive indices among the drops themselves, there is diffusion within the PDLC layer 7 and this radiation is depolarized and consequently partly transmitted by the second polarizer 11. In this case the display panel 5 is in the bright state. However, when, as is shown in FIG. 3b, a voltage is applied across the layer 7, in other words when image information to be displayed is applied and the molecules 51 in the drops 47 are thus subjected to an electric field in the direction 50, there is no difference in orientation between the various drops and the ordinary refractive index $n_o$ is adapted to the refractive index $n_p$ of the polymer material of the matrix. In this case the PDLC layer 7 is transparent in the direction of the applied field. The radiation from the radiation source is again polarized by the first polarizer 9 but is transmitted by the PDLC 7 while maintaining the state of polarization and subsequently reflected by the second, complementary polarizer 11. In this case the display panel 5 is in the dark state.

Figure 4A:
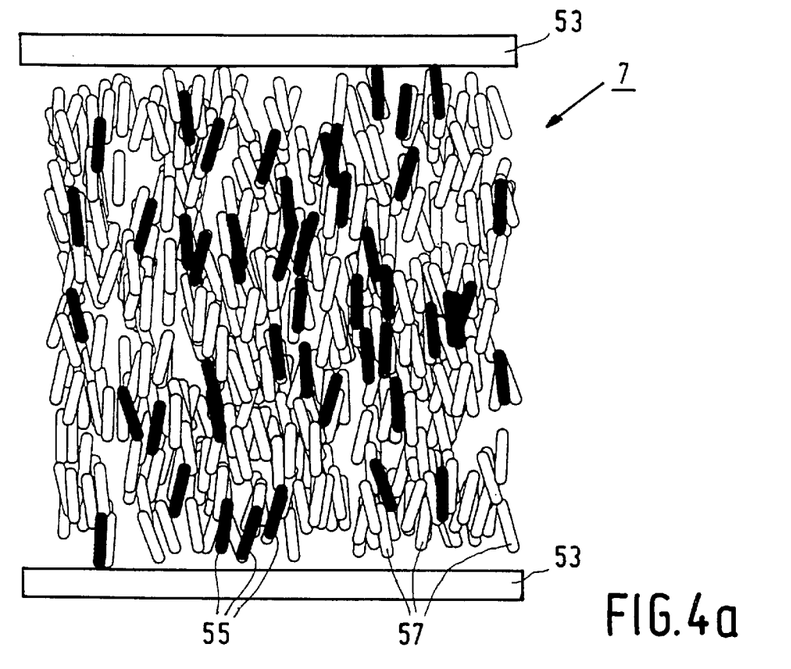
FIG. 4a–b shows diagrammatically an optically active diffusing medium in the form of a diffusing gel (a) without and (b) with an applied voltage.
Figure 4B:
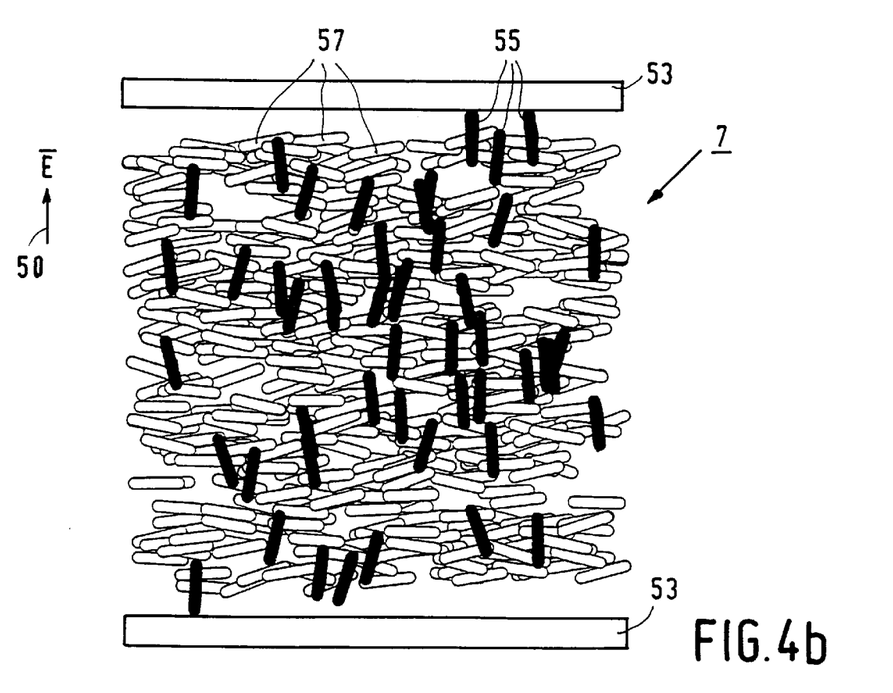

In order that the birefringence and the diffusion within the optically active diffusing medium are preferably minimal in the transparent state of this medium, even upon a non-perpendicular passage, so as to maintain the dark state of the display panel, an embodiment may be chosen in which the medium is a liquid crystalline material which comprises polymerizable molecules and ordinary, non-polymerizable molecules. Such a material is a diffusing gel and is known, for example from U.S. Pat. No. 5,188,760. FIGS. 4a and 4b show an example of such a gel. The layer 7 is a mixture of polymerizable molecules 55 and ordinary molecules 57 of liquid crystalline material. When no voltage is applied across the layer 7, all molecules 55, 57 are oriented substantially perpendicularly to the substrate 53, as is shown in FIG. 4a. In practice, an orientation layer, which is not shown, is present between the diffusing medium 7 and the substrate 53. Incident radiation is transmitted without obstruction, which means that the layer 7 is transparent. This results in the dark state for the display panel 5, because the radiation transmitted by the first polarizer 9 does not change its state of polarization and is thus blocked by the second, complementary polarizer 11 and will again be reflected in the layer 7. However, when a voltage is applied across the layer 7, at which the direction of the electric field is denoted by the arrow 50, the polymerizable molecules 55 will remain perpendicularly oriented on the substrate 53, as is shown in FIG. 4b, while the ordinary molecules 57 tend to direct themselves parallel to the substrate 53. In this state the layer has a diffusing effect, which means that the display panel 5 is in the bright state.

The optically diffusing medium 7 may alternatively be a different liquid crystalline polymer composite such as, for example a PNLC (Polymer Network Liquid Crystal) as is known per se, for example from the article: "Electro-optic Properties and Multiplexibility for Polymer Network Liquid Crystal Display (PN-LCD)" by T. Fujisawa et al. in Japan Display '89, pp. 690–693, or an NCAP (Nematic Curvilinear Aligned Phase) as is known per se, for example from the article: "Polymer Encapsulated Nematic Liquid Crystals for Display and Light Control Applications" by J. Ferguson in SID International Symposium 1985, Digest of Technical Papers, pp. 68–70.

To prevent disturbing effects due to birefringence in the medium, a retardation layer 59, which is shown by means of a broken line in FIGS. 1a, 1b and 2, may be provided on top of the display panel 5 of the display device. Such retardation layers are known per se from the article: "Highly Multiplexed Super Homeotropic LCD" by. J. F. Clerc et al. in Japan Display 1989, pp. 188–191.

In the above-described embodiments of the optically diffusing, depolarizing layer 7, the layer 7 is switchable between a transparent and a diffusing state. In the transparent state, the crossed polarizers 9, 11 ensure that no light from the radiation source is transmitted by the display panel. The transparent state of the layer 7 thus corresponds to the dark state of the display panel. In the diffusing state, the layer operates as a depolarizer. This means that half the light will be transmitted by the second polarizer 11 and half will be reflected. This reflected light will subsequently be reflected between the reflector and the two polarizers until it has the suitable state of polarization to pass the second polarizer 11 in the direction of the viewer. There is depolarization at each passage through the layer 7. The medium 7 thus has a dual function. On the one hand, it has the function of a display panel with pixels which are energized in accordance with the image information to be displayed, and on the other hand, it forms part of the brightness-enhancing system.

We claim:

1. A display device comprising an illumination system having a radiation source for supplying a radiation beam, and a diffusing display panel comprising an optically active diffusing medium which is switchable between a transparent, polarization-maintaining state and a diffusing, depolarizing state for the radiation beam, a first polarizer having a first polarization effect and a second polarizer having a second, complementary polarization effect, said polarizers enclosing the medium, characterized in that at least said first polarizer is a reflecting polarizer and in that polarization-converting means are arranged at a side of said first polarizer facing away from the diffusing medium, said polarization converting means converting light reflected from said first polarizer to a state of polarization which is transmissible by said first polarizer; said optically active diffusing medium, in said polarization-maintaining state, being transparent to light in said state of polarization which is transmissible by said first polarizer.

2. A display device as claimed in claim 1, characterized in that the two complementary polarizers are reflecting polarizers.

3. A display device as claimed in claim 1, characterized in that the reflecting polarizer is a cholesteric filter and in that the polarization-converting means comprise a reflector.

4. A display device as claimed in claim 3, characterized in that the cholesteric filter comprises a plurality of layers of a liquid crystalline material, each layer being active for a different wavelength band, said wavelength bands jointly covering the visible wavelength range.

5. A display device as claimed in claim 3, characterized in that the cholesteric filter comprises a single layer of a liquid crystalline polymer material, within which layer the pitch of the molecular helix varies between two values which correspond to the lower limit and the upper limit, respectively of the reflection band required to cover the full visible wavelength range.

6. A display device as claimed in claim 5, characterized in that the diffusing medium is constituted by a liquid crystalline layer which is enclosed between two optically transparent plates, and in that the cholesteric filters constitute a three-dimensional network and a self-supporting film which is suitable to be provided directly on the plates.

7. A display device as claimed in claim 3, wherein the cholesteric filter comprises layers characterized in that at least a plurality of said layers of the cholesteric filter comprises a liquid crystalline polymer in which the pitch of the molecular helix varies, each layer being active in a different wavelength band.

8. A display device as claimed in claim 1, characterized in that the reflecting polarizer is a reflective linear polarizer and that the polarization-converting means are constituted by a reflector and a λ/4 plate which is arranged between the first polarizer and the reflector.

9. A display device as claimed in claim 1, characterized in that the optically active diffusing medium comprises a polymerizable liquid crystal.

10. A display device as claimed in claim 1, characterized in that a retardation plate is provided on the side of the second polarizer facing away from the illumination system.

11. A display device comprising an illumination system having a radiation source for supplying a radiation beam, an optically active diffusing medium which is switchable between a transparent, polarization maintaining state and a diffusing, depolarizing state for the radiation beam, a first polarizer between said optically active diffusing medium and said radiation source, said first polarizer being a reflecting polarizer which transmits light having a state of polarization which is transmissible by said optically active diffusing medium when said medium is in said transparent, polarization-maintaining state, a polarizing reflector arranged oppositely of said radiation source from said first polarizer, said polarizing reflector converting light reflected from said first polarizer to a state of polarization which is transmissible by said first polarizer, and a second polarizer arranged oppositely of said diffusing medium from said first polarizer, said second polarizer blocking radiation having said state of polarization which is transmissible by said first polarizer.

12. A display device as in claim 11 wherein said second polarizer is a reflecting polarizer.

13. A display device as in claim 11 wherein said second polarizer is an absorbing polarizer.

* * * * *